Figure 1:
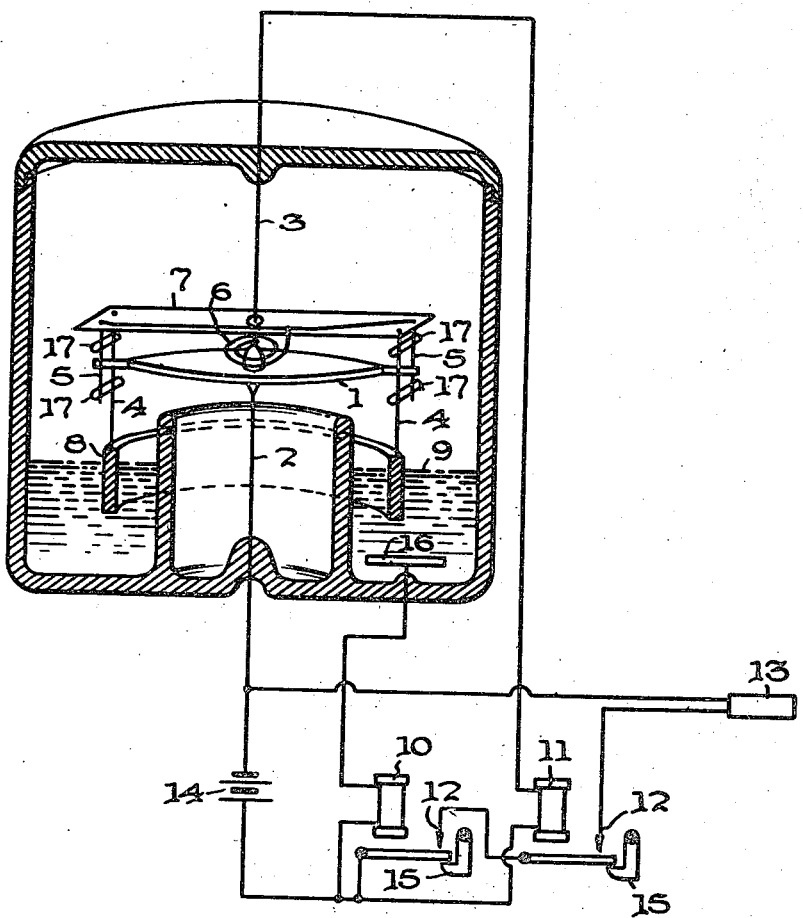

Dec. 17, 1946.   G. MUFFLY   2,412,742
DISTURBING INFLUENCE DETECTING ELEMENT
Filed Nov. 13, 1944   2 Sheets-Sheet 1

Inventor
GARY MUFFLY

UNITED STATES PATENT OFFICE 2,412,742

DISTURBING INFLUENCE DETECTING ELEMENT

Gary Muffly, Penn Township, Allegheny County, Pa., assignor to Gulf Research & Development Company, Pittsburgh, Pa., a corporation of Delaware Application November 13, 1944, Serial No. 563,251

7 Claims. (Cl. 177—352)

This invention pertains to a device for indicating a disturbance in the normal conditions surrounding the mechanism and in particular one which indicates when the disturbance has reached its maximum value. The disturbance may be magnetic, electric, acoustic or any condition which may be converted into an electric indication.

In the operation of detecting mechanisms for control operations it is often of insufficient value to make the detector respond merely at a certain field value. It is quite often essential that the device indicate the peak of a disturbance which first increases and then recedes. This invention has for one of its principal objects the provision of a device for indicating the time of maximum value of a disturbance, that is, it gives an indication just as the disturbing influence begins to recede.

Another object of the invention is to produce a device which indicates the moment of maximum disturbance electrically, regardless of the nature of the disturbing influence itself, in order that a remote indicator may be used.

One manifestation of the maximum of a disturbance is that of closest approach of a passing vehicle, vessel, or other disturbing influence. As a disturbing influence approaches a point, its effect first increases, then reaches a maximum and then decreases. This is still true if the disturbance passes some distance from the point. It is generally true whether the disturbance be magnetic, electric, electromagnetic, optical, acoustic, thermal or any other. In order to carry out this invention it is only necessary that the influence be convertible into an electrical indication, that is, by means of a magnetic detector, tuned electric circuit, photocell, sound detector, pyrometer, and other such known devices.

One example of the application of the device is in submarine warfare. In detecting devices for use with mines it is a problem to obtain an indication of the correct time for firing so that the mine will be set off at the opportune moment to inflict the greatest damage. It must go off near the vessel or vehicle in order to cause appreciable damage. This invention concerns a device for firing an influence mine at the optimum instant in order to inflict maximum destruction to a passing vessel. The instant of closest approach is the ideal firing time and it is accordingly an object achieved by my invention to provide a device for automatically accomplishing this aim.

If a detector element in a mine is made sensitive enough to indicate or trip on very small targets, then very large ones may actuate the mine from such a large distance that no damage will be done to the target. Very large or very strongly magnetic vessels may then actuate the mine so it fires as much as several hundred feet before the ship gets to the mine. Thus a further object of this invention is to provide means for indicating the closest approach of a target regardless of its physical size or the magnitude of the disturbance produced by it.

Influence mines usually operate to fire when the influence attains an arbitrarily chosen value, or after the lapse of an arbitrarily chosen time from initial detection. The present invention is designed to give a firing signal, or alternatively to actually do the firing, when the influence reaches its greatest or peak value. By picking the peak response regardless of its magnitude, the target is sure to be caught at about its nearest point of approach.

The means for obtaining the response, that is, the detecting element itself may be entirely electrical or partly mechanical. Various types of influences may be used, but magnetic or acoustic effects are most common and will be described herein, but this invention is not meant to be limited to the above.

It is furthermore evident that the invention may be used to indicate the instant at which an influence reaches its minimum as well as maximum.

In the accompanying drawings I have shown by way of example two of the many possible embodiments of my invention, in which Fig. 1 is a diagram of a magneto-mechanical detecting system which may be used.

Figure 2:
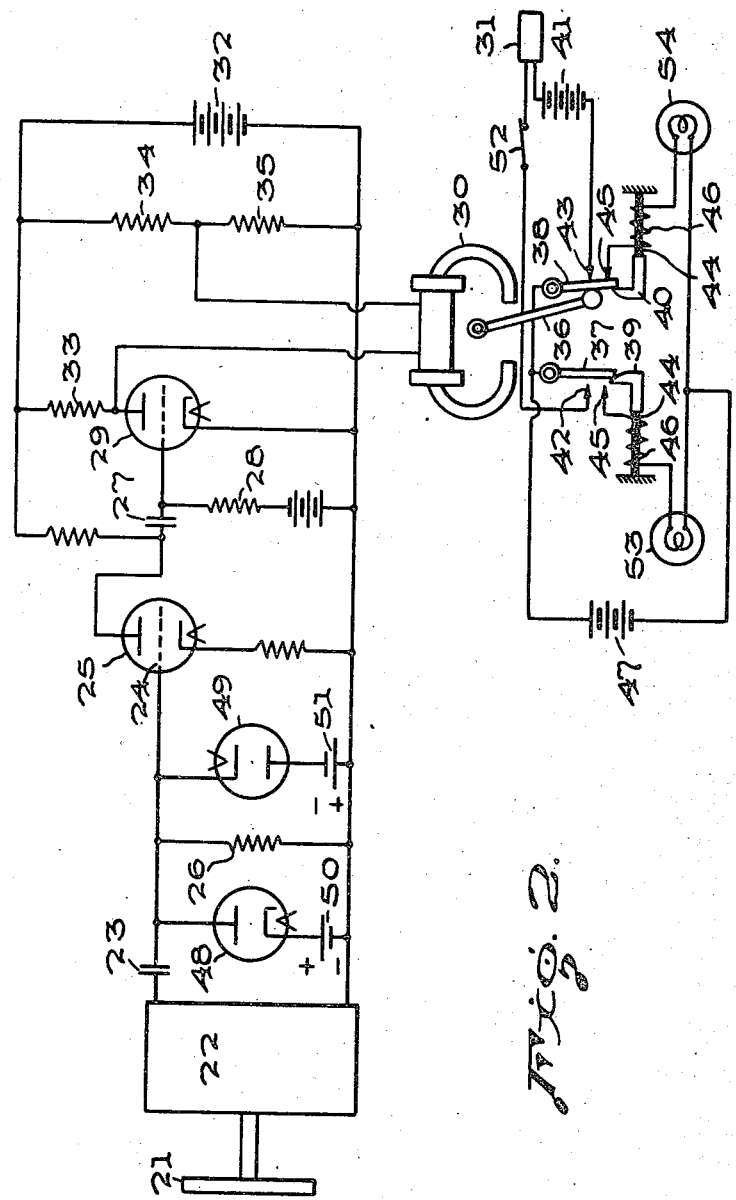

Fig. 2 illustrates an improved form of the invention using electronic circuits instead of a mechanical system.

Referring more particularly to the drawings:

Fig. 1 shows a simplified magnetic detecting system which may be used particularly as a low or medium sensitivity mine. It does mechanically what may also be done electrically as will be pointed out in later parts of this disclosure and will make the understanding of the more complicated device easier. In Fig. 1 a magnetized compass needle 1 is suspended on slender wire filaments 2 and 3. The wire should be so fine that it will have little effect on the sensitivity of the needle. The needle will line up approximately with the earth's field if the restoring force of wires 2 and 3 is small. However, if a vehicle approaches, the direction of the field will be slightly disturbed and the needle will change position. If the needle moves clockwise, it will contact rods 4 at each end of the needle, but rods 5 will be contacted if it moves counter-clockwise. Since the contact rods 4 and 5 must be very close to the tips of the magnetic needle for high sensitivity, and the position of the needle cannot be predicted accurately, it is necessary to use special means to keep the needle normally centered between the contacts independently of the position of the needle. This is accomplished by a very flexible spring 6, which attaches to the needle and to the strip 7, which spaces and insulates the contact rods. Rods 4 also serve to support strip 7 from a damping ring 8 which is preferably floating in a viscous fluid 9. The fluid and damping ring should be designed so that the relatively strong magnetic forces will move the ring readily when the needle is deflected against either pair of contact rods, but it should provide heavy damping of the ring alone when the needle is between the rods and only the weak spring 6 is acting to move the ring. If these conditions are satisfied, both sets of contacts will be made during passage of a target even though the change of magnetic field is unidirectional. When the deflection occurs as the target comes up, the needle will strike one pair of contacts and drag the damping ring along with it. When the peak deflection is reached, however, the damping ring will tend to remain at the maximum deflection because of its damping, while the needle will drop back and very shortly strike the other pair of contacts.

On the approach of a target the initial deflection may occur in either direction, and it may occur at too great a distance. Therefore the two contact closures are used to actuate separate circuits, both of which must be actuated before the mine will fire. In the device of Fig. 1, lock-in relays 10 and 11 are tripped separately by the two contact closures, and the heavier contacts 12 closed by the relays are connected in series with detonator 13 and battery 14 to set off the mine after both relays have tripped. Latches 15 hold the relays in so that the first one actuated will remain closed while the magnet swings over to its second set of contacts.

The electrical circuit to the needle is through wire 2. Contacts 5 are connected together and through spring 6 to wire 3, which is insulated from the magnetic needle. Contacts 4 connect to a conductive surface on ring 8 which will transmit the current through the liquid to a submerged electrode 16. Obviously liquid 9 must be a reasonably good electrical conductor. The case is made of an insulating material or a metal with insulating bushings for the lead wires. Contacts 4 and 5 may be spaced by means of insulating beads 17 of glass or the like.

Fig. 2 illustrates an improved electronic circuit for providing the desired firing action without the use of delicate contacts. Here the detecting device 21 may be a magnetic detector such as disclosed for example in Vacquier application, Serial No. 403,455, or it may be a suitable hydrophone or other influence-receiver suited to the use to which the mine is put. Its associated equipment 22 includes whatever amplifiers or other devices are necessary to give an electrical output which fluctuates in response to the target. For example, with a microphone an amplifier would usually be used here with a rectifier to provide D. C. output in proportion to the sound level being received. The fluctuations would be coupled through a large condenser 23 to grid 24 of an amplifier tube 25. Condenser 23 and grid leak 26 should be large enough to pass the slowest fluctuations of interest. From tube 25 the signal may pass through another large condenser 27 to another grid leak 28 and amplifier tube 29. This tube may actuate a firing relay 30 to fire detonator 31. Relay 30 can be a polar relay which will operate in opposite directions depending on whether tube 29 is driven upward or downward from its normal value of plate current. The relay current should normally be zero because it is connected bridge-wise to plate battery 32 by means of resistors 33, 34 and 35, and the resistance of tube 29. Signals change the tube resistance, unbalancing the bridge circuit and throwing armature 36 to the left or right as the case may be. Switches 37 and 38 on the relay may be closed in this manner. Latches 39 and 40 hold the switches closed temporarily so that if both switches are closed within a reasonable length of time the detonator 31 is fired from battery 41 through series contacts 42 and 43.

If only one switch is actuated on relay 30, as by a target passing just out of range, it is desirable to reset it so that proper firing will occur on succeeding targets. This may be done by having the lock-in latches 39 and 40 mounted on bimetal strips 44 which will be electrically heated so as to deflect downward and release the switches after a time interval. The heat would be turned on by auxiliary contacts 45 on the switches connecting to coils of insulated resistance wire 46 wound on the bimetal strip. Battery 47 would provide the heating energy. If the device is operated by remote control over cable, indicating lights 53 and 54 may be used to show when the relay is actuated in either direction. In this case, firing and resetting may be done manually if desired.

To get relay 30 to close the second switch approximately when the influence recedes from the first substantial peak, a special circuit arrangement is used involving diodes 48 and 49. These diodes are placed in parallel with the grid circuit of tube 25. They are biased with cells 50 and 51 so that they draw no current, or at least have negligible shunting effect on resistor 26. They therefore do not affect the time constant of the grid circuit for very small deflections. This condition is achieved usually with a bias of 1 or 1½ volts on each diode. The diodes are turned in opposite directions so that one will draw current on an upswing of signal and the other on a downswing. As a result, they tend to limit the signal swings to values somewhat greater than that required to actuate the relay. If the first signal swing is upward as it may normally be in an acoustic receiver (it may be either up or down in a magnetic detector) there will be a rise in voltage at grid 24. The actual generated signal may be several volts in the detector circuit 22 but the rise at grid 24 may be limited to a tenth of a volt or more, depending on the bias of cell 50 and the cutoff point of diode 48. This small rise of voltage should operate relay 30 in one direction due to the subsequent amplification, but the balance of the detector signal voltage will mostly appear as a charge in condenser 23. In other words, the amount of the voltage increase divides itself into two parts, one of limited magnitude appearing across the diode 48 (and grid 24), and the remainder appearing across the condenser 23. If the rise of voltage is large, condenser 23 can charge up rapidly through diode 48, since it is no longer subject only to the slight charging current that can pass through leak 26. However, condenser 23 can never charge to a voltage greater than the maximum voltage swing of device 22. For example, if the output of detector 22 reaches a peak swing of 30 volts, these 30 volts, at the moment the peak is reached, may be divided as 29.5 volts of change across the condenser 23 and 0.5 volt of change across the diode 48 and grid 24. If this peak signal should be held artificially, the condenser 23 would ultimately be charged to the full increment of 30 volts, and the 0.5 volt increment would disappear from the grid 24 and the diodes. However, if resistor 26 and condenser 23 have large values as specified, this might take a matter of several minutes. Ordinarily, the peak signals are followed rapidly by decreases so that this tendency to drift back to equilibrium may be ignored. When the crest of the voltage rise is just passed, the signal voltage begins to drop. The voltage on grid 24 begins to drop immediately. Condenser 23 keeps its charge now because the voltage on the diodes again falls within the zone of negligible current. For example, when the signal voltage drops back from the 30-volt peak in the illustration above to 29.5 volts, the charge of 29.5 volts on condenser 23 is exactly neutralized by this momentary signal value, and the grid and diode signal voltage is momentarily zero. Soon grid 24 drops below its normal value even though the signal is still near its maximum, as, for example, to minus 0.2 volt when the signal voltage drops from the 29.5 volts mentioned above to 29.3 volts. At some such point of slightly negative signal on grid 24, relay 30 trips in the reverse direction, completing the firing cycle. If the safety switch 52 in the detonator circuit is open so that the mine does not blow up at this point, the receding signal will drive the voltage at grid 24 downward until a substantial current flows through diode 49 and discharges condenser 23 so that it returns approximately to its initial state. To continue our example, if the signal drops to zero, the grid and diode voltage may be driven to about minus 0.5 volt while condenser 23 discharges rapidly through diode 49. The remaining signal voltage of 29.3 volts across the condenser will drop rapidly to 0.5 volt or so, depending on the cutoff point of the diode, and thereafter drift more and more gradually to equilibrium.

An upward swing of signal voltage tends, upon its removal, to leave the grid 24 with a residual negative voltage. This condition is described as blocking in the art, and would be serious for large swings except that the reversed limiter diode 49 limits the amount of this residual voltage to a very small value. Regardless of the direction or strength of signals, the residual voltage is held within close limits. The blocking or reversal effect does not occur before the swing that causes it begins to recede.

One can see that the firing point will not be exactly at the signal peak. The second relay closure tends to be delayed by the finite recession required to effect the synthetic voltage reversal at grid 24. On the other hand, the resistance-capacitance coupling circuits tend to distort the fluctuations and advance the peaks. These two factors can be balanced against one another to give optimum firing conditions on the average target.

It should be noted that the diode arrangement has another advantage when used with magnetic mines of the type we have developed. This particular mine uses a detector that generates a steady voltage roughly proportional to the steady field value applied to it. If this mine is disturbed by enemy action, it may be suddenly subjected to a new value of field and consequently a new detector voltage. Consequently grid 24 will be thrown far from its normal value of voltage if the diodes are omitted. Condenser 23 still provides for return of the grid voltage to normal but its time constant with leak 26 is long enough so that several minutes may elapse before recovery is satisfactory for operation of the mine. If, however, the diodes are in the circuit, grid 24 will not change voltage as much in the first place and will also come back rapidly into the operating range. Only the last part of the recovery will occur with the normal long time constant. The total recovery time is cut to a mere fraction by this circuit.

In case the bias of tube 25 is of a suitable value, diode 48 may be omitted because grid 24 will then draw current and take over its function. Often, however, more bias is desired on grid 24 than is suitable for the diode action or its bias is not subject to as close control as is desired, and a separate diode is justified.

The stops or contacts 4 and 5 of Fig. 1 and the diodes of Fig. 2 may be considered to be limiting devices. The contacts limit the motion of the magnetic needle with respect to strip 7 of Fig. 1 and the diodes limit the magnitude of the voltage swing on grid 24 in Fig. 2. The trip points of either device are moved along with the indication. When either limit is reached and the indication persists and gets stronger after the device trips in one direction, the second trip point is dragged along with the indication, so to speak. This shifting of the tripping points with respect to the initial indication of the influence device is necessary to get the desired trip action.

The terms "trip" or "tripping" as used in this specification may be defined for purposes of this invention as meaning to actuate something so that it stays actuated either irreversibly, or reversibly upon deliberate action. In most cases one would want reversibility upon deliberate action so that the device may be reset. Such a function may be performed by a latch, but for purposes of this invention a "latch" or "latchable means" as claimed may comprise any equivalent means for carrying out the function of a latch, i. e., actuating so that it stays actuated except for deliberate resetting. Such devices for purposes of this invention may also be electrical or magnetic in character as well as mechanical, for example, the latching relays shown may be replaced by a "thyratron" or gaseous discharge tube which when tripped stays tripped until reset as is well known, or the relay armature may press a snap-over mechanism which would stay snapped, or the device may drop weights, or a magnetic relay may be used to hold the deflection by magnetic attraction. Such expedients may be employed instead of a mechanical latch for purposes of this invention as will be apparent to one skilled in the art.

What I claim is:

1. A device for indicating the proximity of a moving object comprising a detector providing a unitary response to influence of the object, latchable means actuated by a small increment of the response, and latchable means actuated by a small decrease in the same response.

2. A device for signaling the proximity of a passing conveyance comprising an influence detector, a latchable device for giving a warning indication when a predetermined amount of influence is detected by said detector and a second latchable device for giving a final signal when the influence recedes a predetermined amount from a received maximum influence.

3. A device for indicating the instant of closest approach of a disturbing body comprising a detector of the disturbance, said detector actuating a latchable mechanism when excited in one direction, said detector also actuating a latchable mechanism when excited in the opposite direction, and indicators responsive to the latching of both mechanisms and of both in sequence.

4. A device for indicating the instant of closest approach of a disturbing body, comprising a detector of the disturbance having a wide range of response, a sensitive latchable indicator connected thereto which has a much smaller lower threshold of response actuated by an effect in one direction of said detector, a similar sensitive latchable indicator actuated by an effect in the other direction, and means for indicating the consecutive operation of said latching means.

5. A device for indicating the proximity of a disturbance producing moving object, comprising means for electrically detecting the disturbance, means for impressing the voltage on a series connected capacitor and resistor having a long time constant, diodes biased beyond cutoff and shunting said resistor in opposite directions, amplifying means connected across said resistor, the last tube of the amplifier constituting one arm of a bridge circuit, and an indicator showing the direction of unbalance of said bridge circuit.

6. A device for indicating the maximum or minimum of a disturbing influence comprising means for converting the influence into an electrical voltage and having connected thereto a capacity-resistance circuit whose time constant is long compared with the disturbance, the resistance being shunted with diodes in opposite directions and biased beyond cutoff, an amplifier connected across the resistance, and means for indicating the direction of the amplified signal.

7. A device for indicating the proximity of a conveyance comprising a magnetic field indicator responsive to a wide range of magnetic field values, a latchable device set to operate when the field indication shifts a predetermined small amount in one sense from the normal value, a second latchable device set to operate when the field indication shifts a like predetermined amount in the opposite sense from the normal value, and limiting means to shift the latching points along with the indication, said limiting means acting only on shifts at least comparable in magnitude to the amount of shift required to actuate the latching devices, whereby a strong unidirectional magnetic disturbance will operate one of the latchable devices upon its onset and will operate the other latchable device when the disturbance recedes from its maximum value.

GARY MUFFLY.